(12) United States Patent
Hanks

(10) Patent No.: US 7,107,934 B1
(45) Date of Patent: Sep. 19, 2006

(54) LITTER BOX APPARATUS

(76) Inventor: Robert Hanks, 490 Texas Ave., Bridge City, TX (US) 77611

( * ) Notice: Subject to any disclaimer, the term of this patent is extended or adjusted under 35 U.S.C. 154(b) by 0 days.

(21) Appl. No.: 10/893,707

(22) Filed: Jul. 19, 2004

(51) Int. Cl.
*A01K 29/00* (2006.01)

(52) U.S. Cl. .................. 119/170; 119/165; 119/167; 220/908.1; 220/495.08; 220/495.1; 280/47.26; 248/129; 248/128

(58) Field of Classification Search ............ 280/47.34, 280/47.35, 79.2, 47.26, 47.17, 47.19, 47.18, 280/653, 659; 301/30–33; D30/161, 162; 119/161, 163, 165–170, 171–173; 232/43.2; 248/129, 128, 98, 147, 95; 206/366; 220/908, 220/908.1, 908.3, 495.01, 495.06, 495.11, 220/495.08, 757, 629, 254.1, 287
See application file for complete search history.

(56) References Cited

U.S. PATENT DOCUMENTS

| | | | | |
|---|---|---|---|---|
| 3,097,541 A | * | 7/1963 | Kindig | 474/98 |
| 3,162,631 A | * | 12/1964 | Pike | 540/72 |
| 3,460,458 A | * | 8/1969 | Leod | 454/203 |
| 4,357,728 A | * | 11/1982 | Pravettone | 15/257.4 |
| 4,491,252 A | * | 1/1985 | Schmidt et al. | 222/531 |
| 4,753,367 A | * | 6/1988 | Miller et al. | 220/495.11 |
| 4,919,078 A | * | 4/1990 | Morrison | 119/168 |
| 5,102,367 A | * | 4/1992 | Mullaney et al. | 446/448 |
| 5,165,564 A | * | 11/1992 | Prout et al. | 220/254.1 |
| 5,211,305 A | * | 5/1993 | Horton | 229/117.27 |
| 5,267,888 A | * | 12/1993 | Hippely et al. | 446/465 |
| 5,358,138 A | * | 10/1994 | Karwoski | 220/495.11 |
| 5,511,682 A | * | 4/1996 | Pace | 280/47.26 |
| 5,518,136 A | * | 5/1996 | Muldner et al. | 220/495.11 |
| 5,522,344 A | * | 6/1996 | Demurjian | 119/474 |
| 5,632,401 A | * | 5/1997 | Hurd | 220/495.07 |
| 5,662,238 A | * | 9/1997 | Sarno | 220/495.11 |
| 5,868,036 A | * | 2/1999 | Salzman | 74/450 |
| 6,250,492 B1 | * | 6/2001 | Verbeek | 220/495.11 |
| 6,357,653 B1 | * | 3/2002 | Murcia | 229/122.1 |
| 6,651,992 B1 | * | 11/2003 | Smith, Sr. | 280/47.26 |
| 6,662,748 B1 | * | 12/2003 | Hanks | 119/170 |
| 6,722,672 B1 | * | 4/2004 | Cates et al. | 280/47.26 |
| 6,874,797 B1 | * | 4/2005 | Gardenour | 280/47.131 |
| 2004/0222335 A1 | * | 11/2004 | Panek, Jr. | 248/129 |
| 2005/0061820 A1 | * | 3/2005 | Thielking | 220/495.08 |

FOREIGN PATENT DOCUMENTS

FR 2701014 A1 * 8/1994
JP 02215602 A * 8/1990

* cited by examiner

*Primary Examiner*—Andrea M. Valenti
(74) *Attorney, Agent, or Firm*—Egbert Law Offices (57) ABSTRACT

A transportable litter box has a container body and a lid removably received over an open end of the container body. The container body has wheels rotatably connected thereto at an end opposite the open end. The lid has an opening therein suitable for allowing an animal to enter the container body therethrough. A support structure is connected to the lid so as to retain a bag in an open configuration within the container body regardless of the orientation of the container body. The wheels are formed of wheel halves hingedly connected together over an axle.

11 Claims, 6 Drawing Sheets

LITTER BOX APPARATUS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to cat litter boxes. More particularly, the present invention relates to transportable litter boxes that can be easily filled with cat litter and cleaned of the cat litter.

BACKGROUND OF THE INVENTION

House pets, and particularly cats, when confined inside a dwelling for an extended period, require sanitary litter facilities for depositing and containing excrement. Such facilities are known to comprise a receptacle in the nature of a tray partially filled with an absorbent material, typically a particulate clay compound.

Such receptacles pose a number of problems to the home owner. The absorbent litter, while suitable for absorbing pet urine, does not typically absorb any substantial portion of the obnoxious odors produced by the excrement of house pets. These odors escape into the surrounding area and become an annoyance to the homeowner and other inhabitants of the dwelling. The sight of soiled litter in a tray is distasteful to inhabitants of the dwelling.

Moreover, pets frequently instinctively attempt to bury their excrement, and in the process often end up broadcasting litter beyond the confines of the tray, where it can become entrapped in carpet fibers. Once litter has migrated into carpeting, it is generally very difficult to remove, reducing the life of carpeting and often adding to the obnoxious odors tending to pervade the area of the dwelling surrounding the receptacle. Such stray litter particles can also be transported to other areas of the dwelling in the treads of shoes, increasing the difficulty of keeping the dwelling clean.

Furthermore, in order to retain such receptacle in a sanitary condition and minimize obnoxious odors emanating therefrom, the absorbent litter must be changed regularly. This involves periodically disposing of soiled litter and replacing it with unsoiled litter, a distasteful and messy chore which involves unpleasantly close contact with pet litter soiled by animal excrement. In fact, direct handling of soiled litter poses a danger to women of contacting toxoplasmosis during pregnancy. The receptacle itself must be cleaned with a disinfecting cleaner for maximum sanitization, otherwise a residue of soiled litter particles will adhere to the receptacle walls when the litter is changed, contaminating the fresh litter.

Additionally, most commonly used pet litter contains a very fine particulate element which, when the litter is disturbed, billows into the air, to be inhaled by the unfortunate householder charged with changing the litter before settling all over the surrounding areas.

In the past, various patents have issued for various types of litter box apparatus. For example, U.S. Pat. No. 4,299,190, issued on Nov. 10, 1981 to A. Rhodes, describes a litter box with a mechanism for replacing fouled litter which includes a base member supporting a housing for rotation about a transverse axis. The housing includes an open topped lower litter box section and an open bottom upper storage box section in end-to-end engagement with the lower section. A plastic garbage bag is housed in the storage section with its opening border clamped between the confronting faces of the upper and lower sections and a pair of opposed flaps supported by opposite faces of the storage box.

U.S. Pat. No. 4,352,340, issued on Oct. 5, 1982 to J. R. Strubelt, describes a disposable litter device which includes a shell having a removable lid and an access aperture to the side of the shell. A disposable bag is disposed in the shell and held in place within the shell by the lid. A ring is secured to the bag in the vicinity of the aperture.

U.S. Pat. No. 4,788,935, issued on Dec. 6, 1988 to Bella et al., describes a reformable carton and cat litter housing assembly which is made up of a precut and scored sheet of paperboard which is folded initially into a compact shipping carton containing litter and a plastic bag. The carton is partially unfoldable into a support structure having bottom, side and end walls. The support structure is insertable into the bag.

U.S. Pat. No. 4,951,605, issued on Aug. 28, 1990 to F. Brown, describes a litter disposal system which comprises a receptacle including a bag and a tray, and a support structure for supporting the bag in a suspended position. The bag is formed with opposed flap portions adapted to be engaged to securing pegs depending from a top frame of the support structure.

U.S. Pat. No. 5,402,751, issued on Apr. 4, 1995 to J. F. De La Chevrotiere, describes another pet litter box having a built-in filter. This litter box comprises a base portion which has a litter receiving area and a cover portion which has a screen member attached thereto. The screen member extends below the underside of the cover and is spaced therefrom to define a waste receiving pocket between the underside of the cover and the screening member.

U.S. Pat. No. 5,575,238, issued on Nov. 19, 1996 to R. S. Redman, describes a furniture-like litter box housing in the form of various types of household furniture. The purpose of the housing is to conceal the cat litter box in the home environment. The housing has a rear entrance that is concealed from view. The bottom can have a wheel set up in each corner so as to assist in the stabilization and mobilization of the litter box.

U.S. Pat. No. 5,601,052, issued on Feb. 11, 1997 to Rood et al., describes a litter box assembly having an open base portion with a litter holding wing portion extending upwardly therefrom and a removable sifting device disposed therein. The sifting device is disposed between a layer of loose litter material. The sifting device is removable from the base portion to remove clumped and fecal matter therefrom while permitting loose litter material to pass therethrough. U.S. Pat. No. 5,823,137, issued on Oct. 20, 1998 to the same inventors, describes a different type of pivotable sifting device for the litter box.

U.S. Pat. No. 6,135,057, issued on Oct. 24, 200 to B. D. Cummings, describes a litter box which has a base and a snap-on lid. The lid has a recessed opening therethrough to provide access within the litter box. The interior of the lid can include an odor-reducing filter. A removable, disposable liner is provided on the interior of the base so as to facilitate disposal of used litter.

U.S. Pat. No. 6,662,748 issued on Dec. 16, 2003 to the present inventor, teaches a litter box apparatus that has a container with an open top and a closed bottom. A lid is detachably affixed over the open top of the container. This lid has a hole formed therein. A handle is affixed to the container and extends outwardly of the lid. A pair of wheels are rotatably mounted adjacent the closed bottom of the container. At least one support member is affixed to the lid and extends into the container. The support member is a bent rod extending in proximity to the side wall of the container. A flexible bag-shaped liner is received within the interior of the container. The liner has an upper edge interposed between the lid and the periphery of the open top. The support member extends into the liner so as to retain the liner in proximity to the second side wall of the container. A quantity of cat litter can be retained within the liner.

It is an object of the present invention to provide a litter box apparatus that can be easily moved from place to place.

It is another object of the present invention to provide a litter box which is pivotable so as to have one orientation for the filling of the litter box and another orientation for use by the pet.

It is a further object of the present invention to provide a litter box apparatus whereby the pet litter can be maintained on a generally flat surface.

It is a further object of the present invention to provide a litter box apparatus which is substantially closed so as to avoid dispersal of cat litter and the odors associated therewith.

It is still a further object of the present invention to provide a cat litter box which is easy to use, relatively inexpensive and easy to manufacture.

It is a further object of the present invention to provide a transportable litter box which facilitates the easy cleaning of the litter-containing body.

It is another object of the present invention to provide a transportable litter box in which the opening for the animal is movable upwardly and downwardly across the opening of the lid.

It is still a further object of the present invention to provide a transportable litter box which includes removable wheels.

It is still a further object of the present invention to provide a transportable litter box which has a handle that can be manipulated inwardly and outwardly to fit the needs and size of the user.

These and other objects and advantages of the present invention will become apparent from a reading of the attached specification and appended claims.

BRIEF SUMMARY OF THE INVENTION

The present invention is a transportable litter box that comprises a container body having wheels rotatably connected thereto and a lid removably received over an open end of the container body. The container body has an interior volume suitable for the receipt of litter therein. The lid has an opening suitable for allowing an animal to enter the container body therethrough. The lid has means thereon for retaining a bag in an open configuration within the container body regardless of the orientation of the container body. This means is a support structure that is affixed to the lid and is slidably retained within the interior of the container body so as to reside adjacent at least one side wall of the container body. The support structure includes a pair of arms which extend inwardly into the interior volume of the container body from opposite sides of the lid. These arms are positioned adjacent opposite sides of the container body. A pair of arcuate transverse members extend between the pair of arms in generally spaced parallel relationship to each other. This pair of transverse members has a surface positioned adjacent a surface of the container body within the interior volume of the container body extending between opposite sides of the container body.

In the present invention, the opening is slidably positioned on the lid. The opening has a door pivotally connected to said lid. The door is movable between a first position covering the opening and a second position extending angularly outwardly of the opening. The opening has a first accordion member affixed to one side of a frame extending therearound. The opening also has a second accordion member affixed to an opposite side of the frame. The first and second accordion members are movable as the opening slides on the frame. A clamp extends around the periphery of the frame and the first and second accordion members. The clamp is removably engaged with the lid so as to secure the frame thereon.

In the present invention, the container body has a handle slidably connected thereto. The handle is movable between a first position retracted along a side of the container body and a second position extending outwardly of the side of the container body.

Each of the wheels of the present invention is removably affixed to the container body at an end opposite the lid and a side opposite the means for retaining the bag adjacent to the side of the container. Each of the wheels includes a first wheel half having a semicircular outer surface and a semicircular center, and a second wheel half hingedly connected to the first wheel half. The second wheel half has a clasp at a side opposite the hinged connection. The clasp serves to retain the first and second wheel halves in a closed configuration. The wheel are connected by an axle. The axle has a spool affixed to opposite ends thereof. The first wheel half has a semicircular center. The semicircular centers of the first and second wheel halves are rotatably received over the respective spools when the first and second wheel halves are retained in the closed configuration.

A bag is removably received in the container body. The bag has an open end facing outwardly of the open end of the container body. The lid is affixed over a surface of the bag at the open end of the bag. The means for retaining a surface of the bag is adjacent to a side of the container body opposite the wheels.

DETAILED DESCRIPTION OF THE INVENTION

Figure 1:
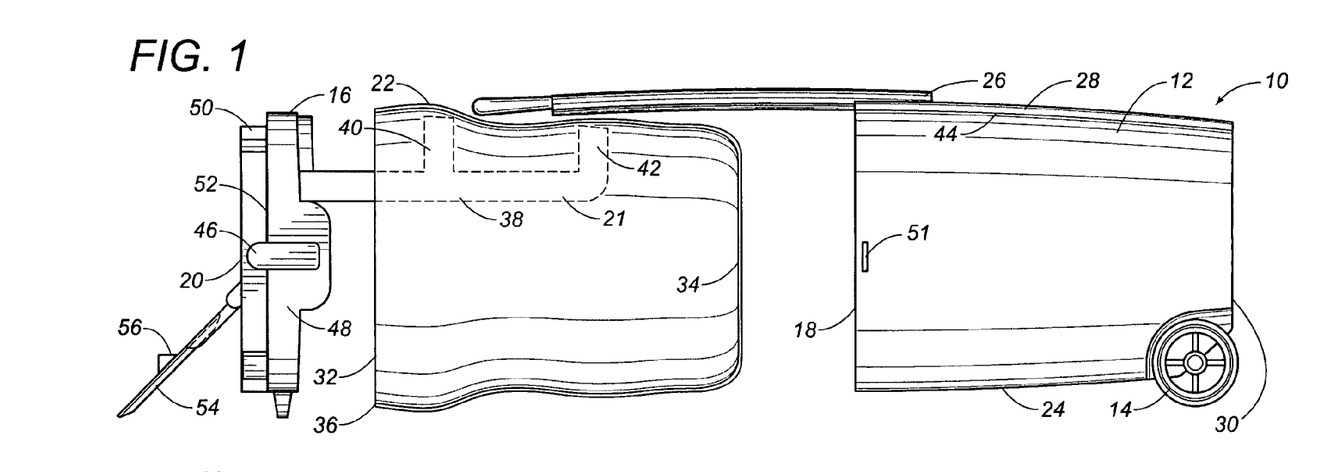
FIG. 1 is a side, partially transparent, view of the apparatus of the present invention.

Referring to FIG. 1, there is shown the apparatus 10 of the present invention. The apparatus 10 of the present invention is a transportable litter box suitable for moving along a surface so as to place the litter box in a desired location while orienting the litter box for proper use by a pet or other animal. The transportable litter box apparatus 10 of the present invention includes a container body 12 having wheels 14 rotatably connected thereto and a lid 16 removably received over an open end 18 of the container body 12. The lid has an opening 20 suitable for allowing an animal to enter the container body 12 therethrough. The lid 16 has a support structure 21 extending therefrom in a position suitable for retaining a garbage bag 22 in an open configuration within the container body 12 regardless of whether the container body 12 is in position lying on a side thereof (as shown in FIG. 1) or in an upright position.

In FIG. 1, it can be seen that the container body 12 has wheels 14 adjacent a bottom surface 24 thereof. A handle 26 is slidably received on a top surface 28 opposite the bottom surface 24. A closed end 30 is formed adjacent to the wheels 14. The relationship of the handle 26 and the wheels 14 allows the container body 12 to be easily pivoted relative to the wheel 14 so as to move from its flat position of FIG. 1 to an upright position in which closed end 30 will rest upon an underlying surface.

The garbage bag 22 has an open end 32 and a closed end 34. The closed end 34 will generally reside against the closed end 30 of the container body 12. The open end 32 has outer edges 36 that can be folded over the periphery of the container body 12 at the open end 18. The support structure 21 is illustrated as extending into the interior of the garbage bag 22. The support structure 21 includes a pair of arms 38 affixed to the lid 16 and extending outwardly therefrom. A pair of transverse members 40 and 42 will extend between the pair of arms 38 in generally spaced parallel relationship to each other. The pair of transverse arms 40 and 42 have a surface positioned adjacent to an inner surface 44 of the container body 12 and extend between opposite sides of the container body 12. As can be seen in FIG. 1, the transverse members 40 and 42 have a generally arcuate shape which will conform to the arcuate shape of the surface 28 of the container body 12. The side of the garbage bag 22 will be interposed between the outer surfaces of the transverse members 40 and 42, along with the outer surfaces of the arms 38, so as to be securely retained within the interior of the container body 12.

Figure 2:
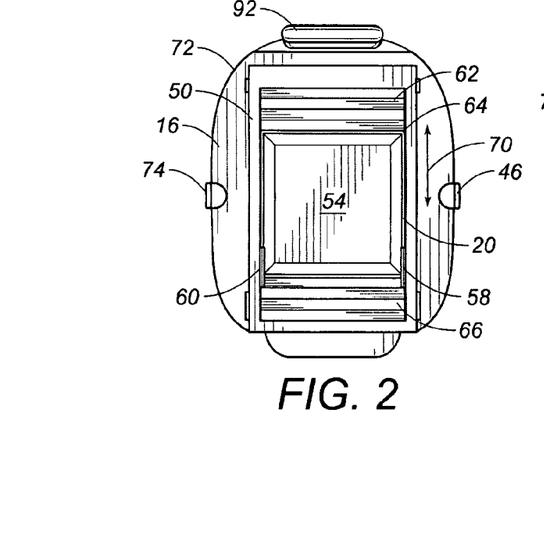
FIG. 2 is an end view of the apparatus of the present invention.

The lid 16 has an interior area which will be affixed over the open end 18 of the container body 12. A clip 46 is affixed to a side 48 of the lid 16. Clip 46 will have suitable latch member which will engage the clamp 50 on the side of the container body 12. As a result, the lid 16 is securely affixed over the open end 18 of the container body 12. A slot 51 is affixed onto the end surface 52 of the lid 16. As will be described hereinafter, the clamp 50 retains the frame of the opening 20 in a slidable orientation relative to the end 52 of lid 16. A door 54 is pivotally connected to the lid 16 at the lower end of the opening 20. Door 54 has a step 56 formed thereon. The door 54 is pivotable between an angularly outwardly extending position (shown in FIG. 1) to a closed position (as shown in FIG. 2). The angularly outwardly extending orientation of the door 54 provides a ramp whereby an animal can entering the opening 20 so as to access the garbage bag 22 within the interior of container body 12. Step 56 can further facilitate the ability of the animal to enter the opening.

In FIG. 2, it can be seen that the door 54 has pivotal connections 58 and 60 on opposite sides of the opening 20. A first accordion member 62 will extend across the opening 20 so as to engage with a frame 64 extending around the door 54. Similarly, a second accordion member 66 will be connected to an opposite end of the frame 64 so as to cover the remaining portion of the opening 20. The door 54 is shown in its closed position. The open position of the door 54 is illustrated in broken lines 68.

In normal use, the apparatus 10 of the present invention will be adapted to various types of cats and other animals. Some animals will be more active than other animals. If the animal is relatively small and inactive, the door 54 can be lowered so that the opening is at a more desirable position for entry by the animal. If the animal is very active or somewhat large, then the door 54 can be raised so that the opening is in a higher position. The higher position of the opening will prevent the animal from scattering litter outwardly of the litter box. The arrow 70 in FIG. 2 shows the upward and downward movement of the door 54 and the associated opening for the entry of the animal within the litter box.

FIG. 2 shows that the lid has a generally curved upper surface 72. The curved upper surface 72 of lid 16 avoids the use of sharp corners which could potentially injure the animal or be damaging to other exterior surfaces as the apparatus 10 is wheeled from location to location. Clips 46 and 74 are positioned on opposite sides of the lid 16 so as to be in a position to engage with the respective slots 50 formed on the container body 12. A foot 76 is affixed to the bottom of the lid 16 so as to support the apparatus 10 in a generally level condition.

Figure 3:
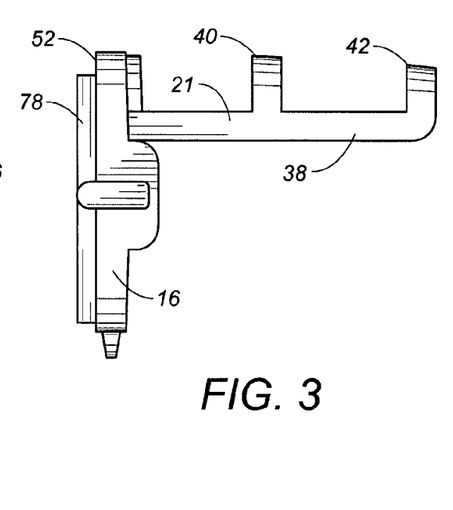
FIG. 3 is a side elevational view of the lid and support structure associated with the apparatus of the present invention.

FIG. 3 is an isolated view of the lid 16 with the support structure 21 particularly illustrated. Support structure 21 includes arms 38 which extends transversely outwardly from the lid 16. Transverse members 40 and 42 extend in a generally arcuate configuration from the arms 38. A bracket 78 is formed at the end 52 of lid 16. Bracket 78 provides an area into which the frame 64 can be inserted. The clamp 50 will be fitted thereover.

Figure 4:
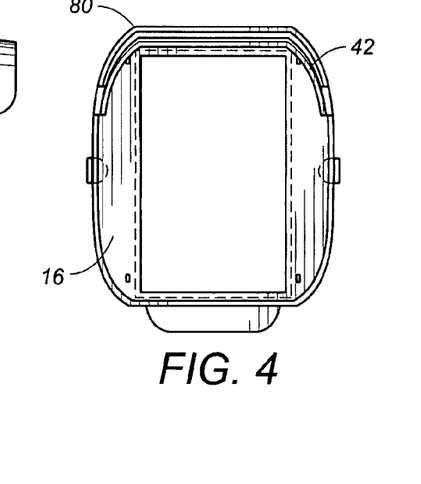
FIG. 4 is an end view showing the lid and support structure of the apparatus of the present invention.

FIG. 4 shows an end view of the lid 16. As can be seen, the transverse member 42 has a generally curved configuration. The upper edge 80 of the transverse member 42 will receive the side of a garbage bag 22 thereagainst.

Figure 5:
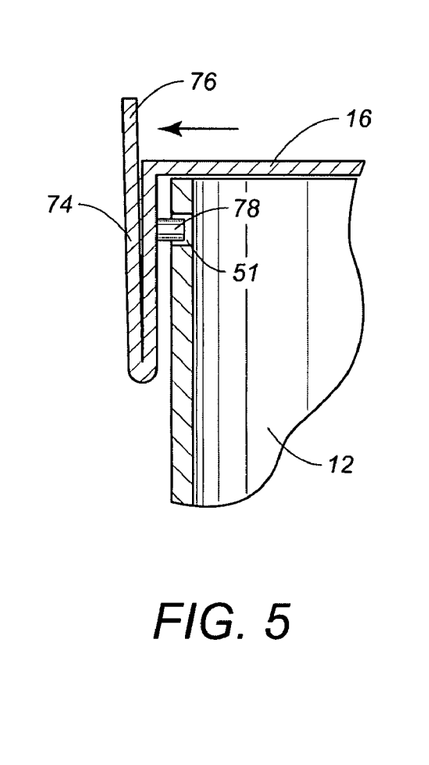
FIG. 5 is a cross-sectional view showing the clip used to secure the lid to the container body.

FIG. 5 shows the manner in which the clip 74 engages the slot 51 on the container body 12. The clip 74 has a tongue 78 which is engageable with the slot 51. A pivoting motion on a foot 76 will serve to disengage the bracket 78 from the slot. It is important to note that various assortments of connection devices can be employed so as to securely affix the lid 16 onto the open end 18 of the container body 12.

Figure 6:
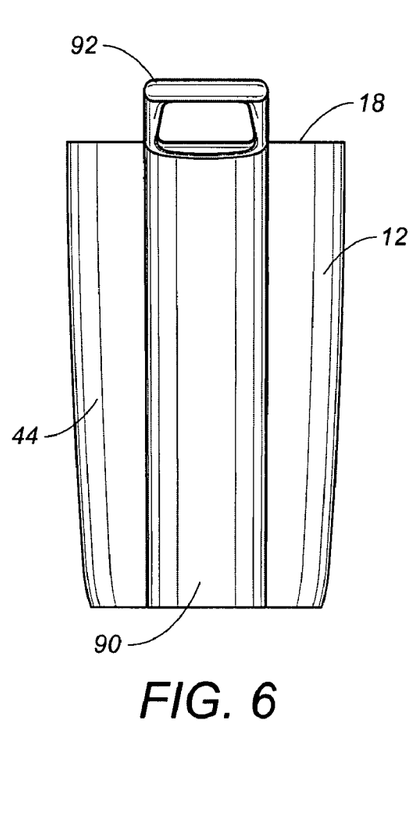
FIG. 6 is an end view showing the handle as secured to the container body of the apparatus of the present invention.

FIG. 6 shows the inner surface 44 of container body 12 as having a handle 26 retained in a retracted position thereon. The handle 26 includes a slide portion 90 with a gripping portion 92 extending outwardly of the open end 18 of the container body 12.

Figure 7:
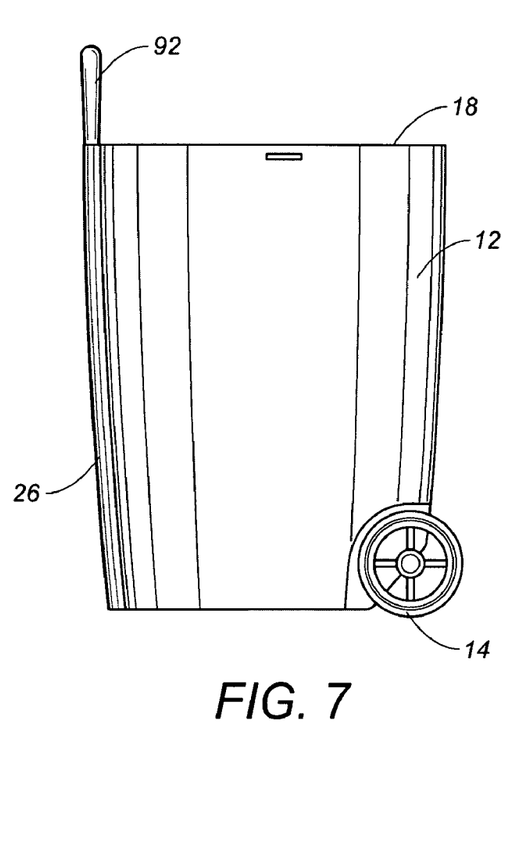
FIG. 7 is a side view showing the orientation of the handle of the present invention on one side of the container body.
Figure 8:
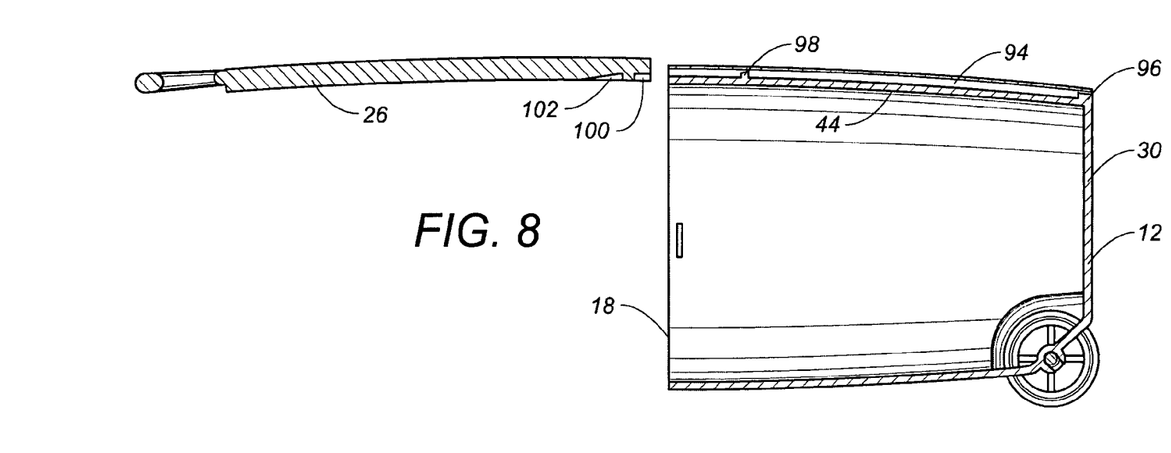
FIG. 8 is an exploded view showing the handle in relation to the container body.

FIG. 7 shows the gripping portion 92 of the handle 26 as extending above the open end 18 of the container body 12. The handle 26 is positioned on the opposite side of the container body 12 from the wheels 14.

FIG. 4 illustrates how the handle 26 is retained within a slot 94 formed on the inner surface 44 of container body 12. Slot 94 is formed in the inner surface 44. A stop 96 extends into the slot 94 from the inner surface 44 of container body 12 generally adjacent to the closed end 30 of container body 12. Similarly, a pin stop 98 is formed generally adjacent to the open end 18 of the container body 12. The handle 26 includes a shoulder 100 adjacent a bottom thereof. When the handle is in its retracted position (such as shown in FIGS. 6 and 7), the shoulder 100 will abut the pin stop 96. In the extended position, the beveled connector 102 would engage the pin stop 98 so as to retain the handle 26 outwardly. A strong pushing motion on the handle 26 will overcome the resistance created by the pin stop 98 so as to cause the handle 26 to move back to its retracted position within the slot 94.

Figure 9:
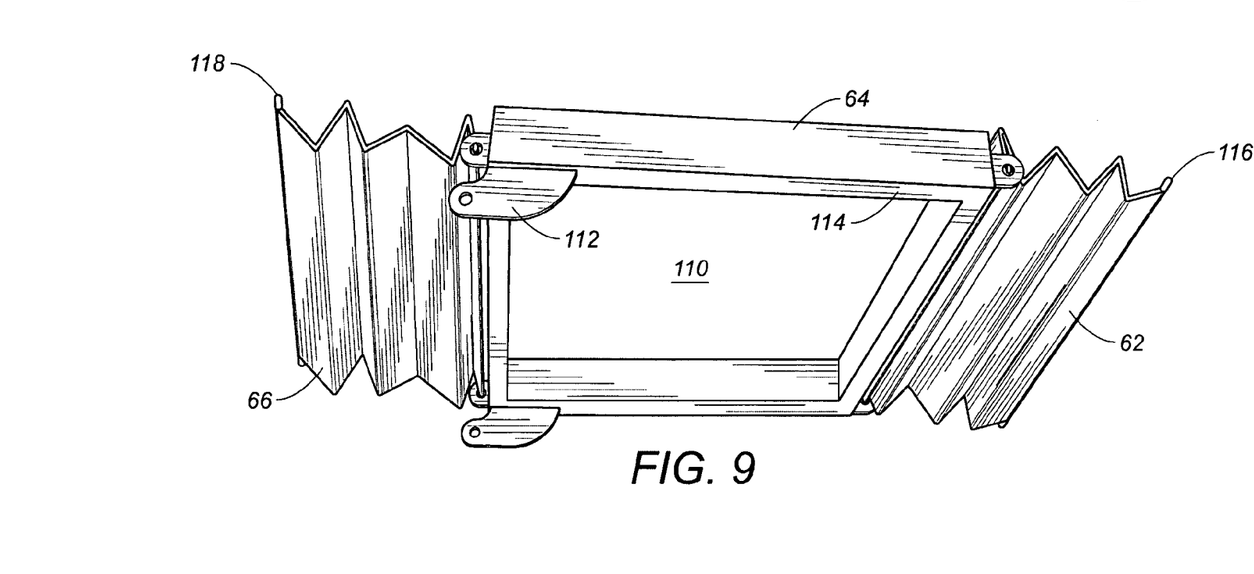
FIG. 9 is a perspective view showing the opening in the lid of the present invention.

FIG. 9 illustrates the frame 64 which defines an opening 110 through which an animal may enter the interior of the container body 12. A first accordion member 62 is affixed to one end of the frame 64. A second accordion member 66 is affixed to an opposite end of the frame 64. The accordion members 62 and 64 allow the opening 110 to move upwardly and downwardly relative to the opening in the lid 16 so as to allow for the proper positioning for the entrance of the animal. Accordion members 62 and 66 will assure that the remainder of the opening 20 remains closed. As a result, the litter material will be retained within the garbage bag 22 and will not escape around the periphery of the frame 64. A suitable hinge section 112 is formed adjacent to the lower end of the frame 64. Hinge section 112 can be used so as to pivotally attach the door 54 thereto. The door can be moveable upwardly so as to reside against the front face 114 of frame 64. As will be described hereinafter, the end 116 of the first accordion member 62 and the end 118 of the second accordion member 66 have a protrusion projecting therefrom. These protrusions at the ends 116 and 118 will engage suitable holes formed on the inner walls of the lid 16 generally adjacent to the opening 20.

Figures 10, 11:
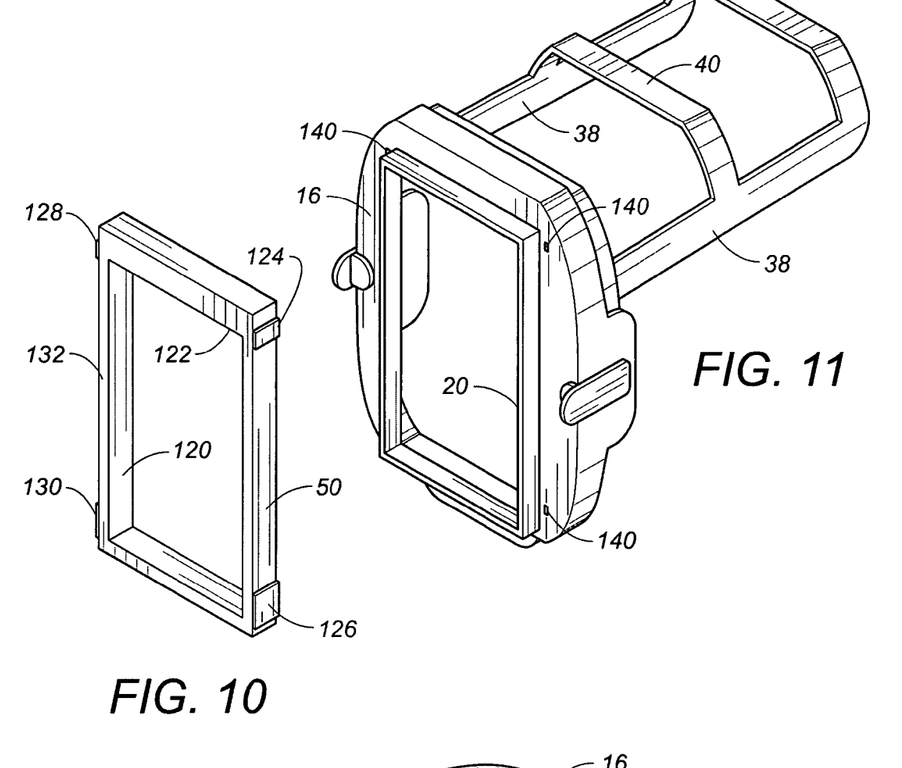
FIG. 10 is a perspective showing the clasps used to secure the opening onto the lid of the container body.
FIG. 11 is an isolated view showing the lid of the present invention without the opening or clasps secured thereto.

FIG. 10 shows the clamp 50 which is used to secure the frame 64, along with the accordion members 62 and 66, within the opening 20 of the lid 16. Slot 51 has a generally rectangular configuration. An inner lip 120 is formed around the inner periphery 122 of clamp 50. Clasps 124, 126, 128 and 130 extend around the outer periphery 132 of the clamp 50. These clasps 124, 126, 128 and 130 will engage suitable openings formed around the periphery of the opening 20 on the lid 16. In particular, in FIG. 11, the lid 16 is generally illustrated. As can be seen, lid 16 has the arms 38 extending transversely outwardly therefrom on a rear side thereof. One of the transverse members 40 is illustrated as extending between the arms 38. The lid 16 defines the opening 20 therein. Opening 20 has a generally rectangular configuration. Apertures 140 are positioned around the opening 20 at the corners of the opening. Apertures 140 are suitable for receiving the clasps 124, 126, 128 and 130 therein. As such, the clamp 50 can be securely engaged on the lid 16.

Figure 12:
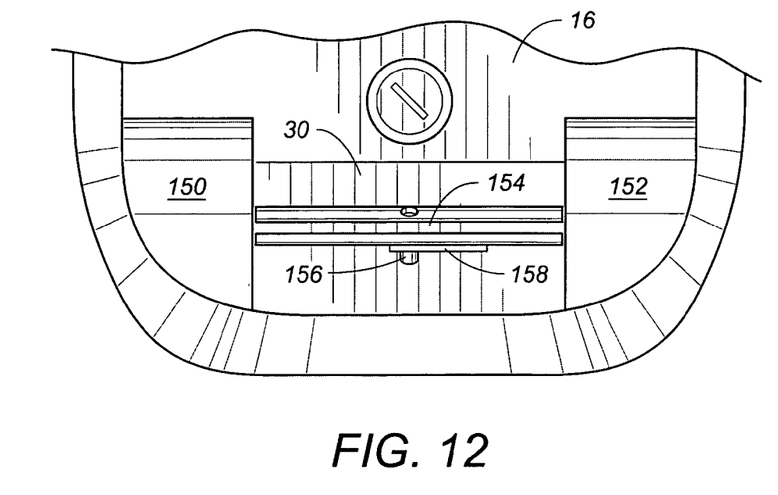
FIG. 12 is a bottom view of the container body of the present invention without the wheels attached thereto.

FIG. 12 shows the closed end 30 of the container body 12. As can be seen, wheel wells 150 and 152 are formed on opposite sides of the container body 12. The wheel wells 150 and 152 serve to assure that the wheels 14 are retained such that the periphery of the wheels 14 are at least flush with the sides of the container body 12 or positioned inwardly therefrom. As such, the wheels 14 will not snag on exterior surfaces as the apparatus 10 is wheeled from location to location. A slot 154 is formed on end 30. Slot 154 is configured so as to receive an axle extending between the wheels 14. A locking pin 156 is located centrally of the slot 154. An engagement member 158 can be secured to the locking pin 156 so as to retain the axle within the slot 154.

Figure 13:
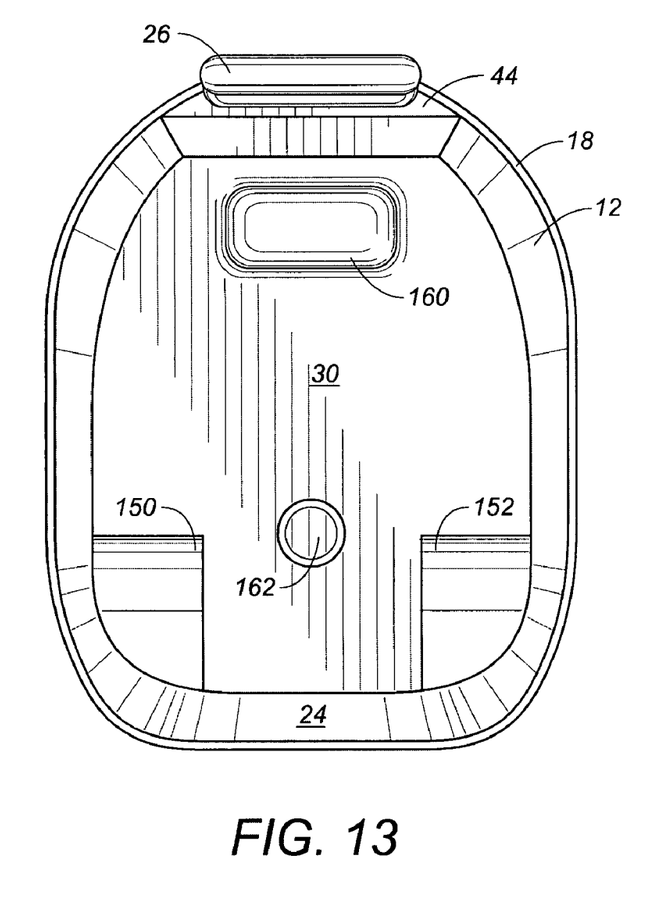
FIG. 13 is interior view of the container body of the present invention.

FIG. 13 shows the interior of the container body 12. As can be seen, the handle 26 is positioned adjacent to the inner surface 44 of the container body 12. The closed end 30 faces the open end 18 of container body 12. A handle indentation 160 is formed in end 30. A bung hole 162 is formed adjacent to the bottom surface 24 of the container body 12. The wheel wells 150 and 152 are shown as positioned inwardly of the side of the container body 12 generally adjacent to the bottom surface 24 and opposite the handle 26.

Figure 14:
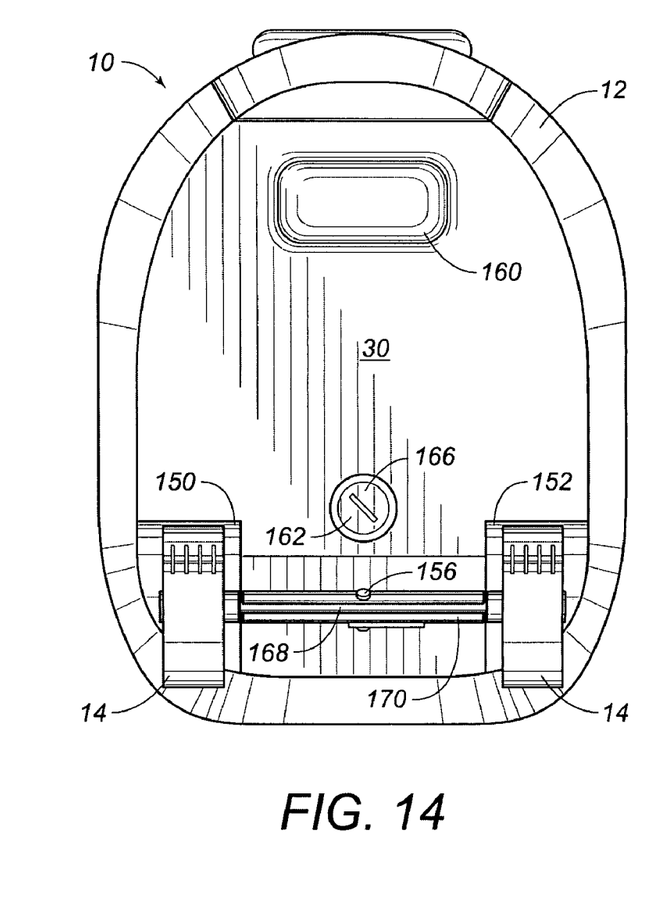
FIG. 14 is a bottom view of the container body of the present invention with the wheels secured thereto.

FIG. 14 illustrates the handle indentation 160 at the closed end 30 of container body 12. The bung hole 162 has a threaded plug 166 threadedly received therein. The bung hole 162 is closed when the apparatus 10 of the present invention is in use. When it is desired to fill the interior of the container body 12 with water, or if it otherwise desired to clean the interior of the container body 12, then the bung hole 162 can be opened so as to allow for the removal of water therefrom. Alternatively, a garden hose can be inserted into the bung hole 162 so as to properly flush the interior of the container body 12. The threaded plug 166 can be easily secured thereover or removed therefrom by rotating so that the threaded connection is released.

In FIG. 14, it can be seen that wheels 14 are received within the wheel wells 150 and 152 at the closed end 30 of container body 12. Axle 168 is removably received within the slot 154 and secured by cover plate 170 onto the locking pin 156. Axle 138 allows the wheels 14 to be rotatably connected to the container body 12.

Figure 15:
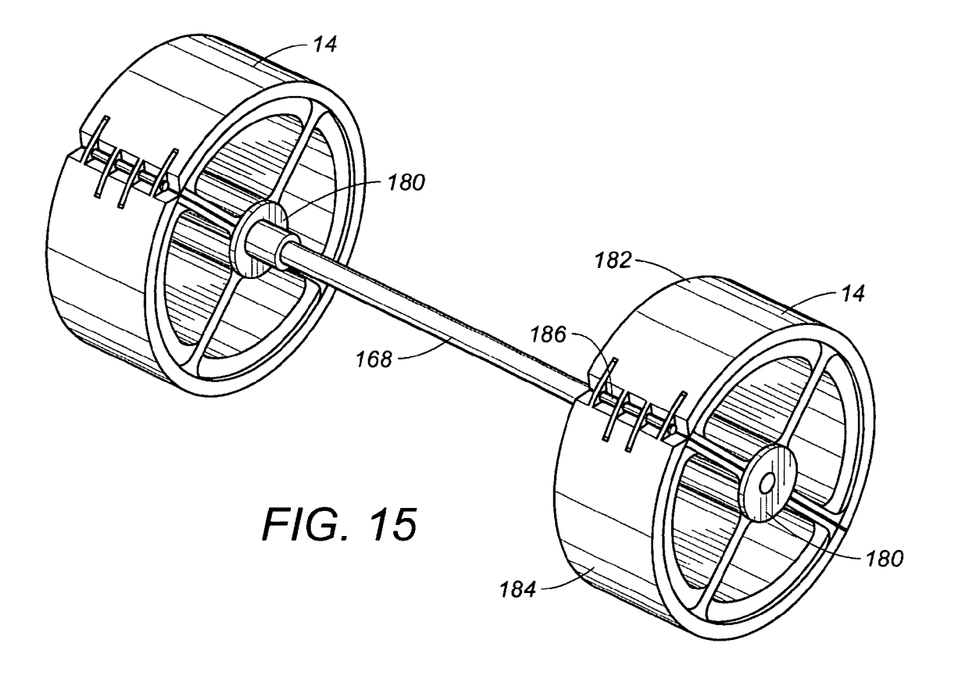
FIG. 15 is a perspective view showing the wheels and axle as used in the apparatus of the present invention.

FIG. 15 is an isolated view of the wheels 14 as rotatably mounted on the axle 168. As can be seen, the axle 168 has separate spools 180 affixed to opposite ends of the axle 168. The wheels 14 are rotatably mounted on the separate spools 180. The wheels 14 have a unique configuration in which each of the wheels 14 has a first wheel half 182 and a second wheel half 184. A hinge 186 connects each of the wheel halves 182 and 184 together. A clasp (to be described in connection of FIG. 16) will secure the halves 182 and 184 together such that the outer periphery of the wheel 14 is circular.

Figure 16:
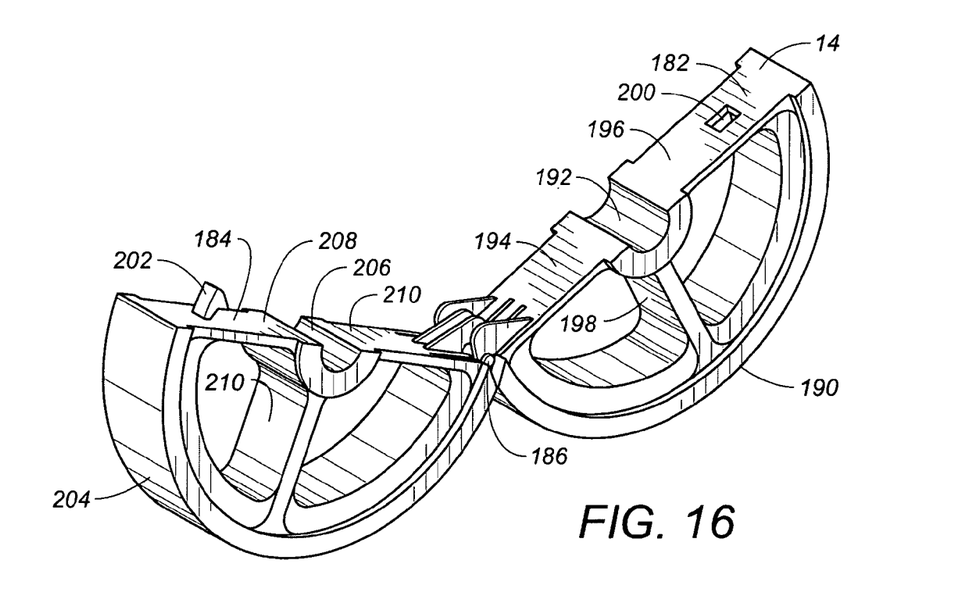
FIG. 16 shows each of the wheels of the present invention in an open configuration.

FIG. 16 illustrates the open configuration of the wheel 14. As can be seen, the wheel 14 has a first wheel half 182 and a second wheel half 184. The first wheel half 182 has a semicircular outer surface 190 and semicircular center 192. Spokes 194 and 196 extend radially outwardly from the semicircular center 192. Another spoke 198 extend radially outwardly of the semicircular center 192 in transverse relationship to the spokes 194 and 196. A slot 200 is formed in the spoke 196. Slot 200 is suitable for receiving a clasp 202 located on the second wheel half 184. The hinge connection 186 is located between the first wheel half 182 and second wheel half 184. The second wheel half 184 has a generally identical configuration to the first wheel half 182. Specifically, the second wheel half 184 has a semicircular outer surface 204 and a semicircular center 206. Spokes 208 and 210 extend radially outwardly of the semicircular center 206 on opposite sides thereof. A transverse spoke 210 extends radially outwardly of the semicircular center 206. When the first wheel half 182 is pivoted with respect to the second wheel half 184, the clasp 202 will engage outer surface 204 so as to retain the wheel halves 182 and 184 in juxtaposition so as to form the wheel 14 with a circular outer surface and a circular center.

In normal use, when it is desired to assemble the apparatus 10 of the present invention, the unique configuration of the wheels 14 can be simply closed upon separate spools 180 so as to be properly assembled. When it is desired to disassemble the apparatus 10, the clasp 202 can be released from slot 200 so that the halves 182 and 184 can be separated and removed from the separate spools 180.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

We claim:

1. A transportable litter box comprising:
    a container body having wheels rotatably connected thereto, said container body having an interior volume suitable for receipt of litter therein, said container body having an open end and a closed end; and
    a lid removably received over said open end of said container body, said lid having an opening therein suitable for allowing an animal to enter said container body, said lid having means thereon for retaining a bag in an open configuration within said container body regardless of whether said container body is in a horizontal orientation or a vertical orientation, said means comprising:
        a support structure affixed to said lid and extending into said interior volume of said container body adjacent at least one side wall of said container body, said support structure comprising:
            a pair of arms extending inwardly into said interior volume of said container body from opposite sides of said lid, said pair of arms positioned adjacent opposite sides of said container body; and
        a pair of transverse members extending between said pair of arms in generally spaced parallel relationship to each other, said pair of transverse members having a surface positioned adjacent a surface of said container body extending between said opposite sides of container body.

2. The litter box of claim 1, said opening being formed on said lid.

3. The litter box of claim 2, said opening having a door pivotally connected to said lid, said door movable between a first position covering said opening and a second position extending angularly outwardly of said opening.

4. The litter box of claim 2, said opening having a first accordion member affixed to one side of a frame extending therearound, said opening having a second accordion member affixed to an opposite side of said frame, said first and second accordion members being cooperatively expandable and compressible as said opening slides on said lid.

5. The litter box of claim 4, said lid further comprising:
    a clamp extending around a periphery of said frame and said first and second accordion members, said clamp removably engaged with said lid so as to secure said frame thereto.

6. The litter box of claim 1, said container body having a handle slidably connected thereto, said handle movable between a first position retracted along a side of said container body and a second position extending outwardly of said side of said container body and of said open end of said container body.

7. The litter box of claim 1, each of said wheels being removably affixed to said container body at an end opposite said lid.

8. The litter box of claim 7, said wheels being connected together by an axle extending across said closed end of said container body opposite said lid, said wheels having an outer surface positioned flush with or inwardly of respective opposite sides of said container body.

9. The litter box of claim 1, each of said wheels comprising:
    a first wheel half having a semicircular outer surface and a semicircular center; and
    a second wheel half hingedly connected to said first wheel half, said second wheel half having a clasp at a side opposite the hinged connection, said clasp retaining said first and second wheel halves in a closed configuration so as to have a circular periphery.

10. The litter box of claim 9, said wheels being connected by an axle, said axle having a spool affixed to opposite ends thereof, said second wheel half having a semicircular center, said semicircular centers of said first and second wheel halves rotatably received over the respective spools when said first and second wheel halves are retained in said closed configuration.

11. The litter box of claim 1, further comprising:
    a bag removably received in said container body, said bag having an open end facing outwardly of said open end of said container body, said lid affixed over a surface of said bag at said open end of said bag.

* * * * *